(12) United States Patent
Hutchings et al.

(10) Patent No.: US 9,285,045 B2
(45) Date of Patent: Mar. 15, 2016

(54) AIRCRAFT FUEL TANK VENT PROTECTOR

(71) Applicants: AIRBUS OPERATIONS LIMITED, Bristol (GB); PARKER HANNIFIN CORPORATION, Irvine, CA (US)

(72) Inventors: Job Telford Kingdom Hutchings, Bristol (GB); Benjamin Richardson, Bristol (GB); Ted Dinh, Irvine, CA (US); Michael Kevin Nolte, Irvine, CA (US); Stuart Robert Fox, Irvine, CA (US)

(73) Assignees: Airbus Operations Limited, Bristol (GB); Parker-Hannifin Corporation, Cleveland, OH (US)

( * ) Notice: Subject to any disclaimer, the term of this patent is extended or adjusted under 35 U.S.C. 154(b) by 314 days.

(21) Appl. No.: 13/767,346

(22) Filed: Feb. 14, 2013

(65) Prior Publication Data

US 2013/0263934 A1 Oct. 10, 2013

(30) Foreign Application Priority Data

Feb. 14, 2012 (GB) .................................. 1202545.8

(51) Int. Cl.
| | |
|---|---|
| *F16K 17/14* | (2006.01) |
| *F16K 17/00* | (2006.01) |
| *F16K 17/40* | (2006.01) |
| *B64D 37/00* | (2006.01) |

(52) U.S. Cl.
CPC .............. *F16K 17/00* (2013.01); *B64D 37/005* (2013.01); *F16K 17/403* (2013.01); *Y10T 137/1714* (2015.04); *Y10T 137/3003* (2015.04)

(58) Field of Classification Search
CPC ........ F16K 17/14; F16K 17/403; F16K 13/04
USPC .......... 137/68.11, 68.13, 68.19, 68.21, 68.27, 137/68.28, 68.29; 220/89.2; 138/39, 40, 89
See application file for complete search history.

(56) References Cited

U.S. PATENT DOCUMENTS

| | | | | |
|---|---|---|---|---|
| 1,429,296 | A | * | 9/1922 | Obert ........................... 220/89.2 |
| 3,199,812 | A | | 8/1965 | Spoecker |
| 2012/0025026 | A1 | | 2/2012 | French |

FOREIGN PATENT DOCUMENTS

WO    WO 2011/010123    1/2011

OTHER PUBLICATIONS

Search Report for GB 1202545.8 dated Jun. 3, 2012.

\* cited by examiner

*Primary Examiner* — Kevin Lee
*Assistant Examiner* — P. Macade Nichols
(74) *Attorney, Agent, or Firm* — Nixon & Vanderhye P.C.

(57) ABSTRACT

An aircraft fuel tank vent (100, 200, 300) having a first interface (102, 202, 302) for fluid communication with an aircraft fuel tank interior, and a second interface (104, 204, 304) for fluid communication with an aircraft fuel tank exterior, the vent comprising: a first flow path (118, 218, 326) between the first interface and the second interface, the fuel tank vent having a baffle (126, 226, 317) positioned in the first flow path, and, a second flow path (124, 224, 326) between the first interface and the second interface, the fuel tank vent having a overpressure device (120, 220, 322) positioned in the second flow path, wherein the first and second flow paths are common along at least a part of their length such that they are coincident at the second interface.

12 Claims, 5 Drawing Sheets

AIRCRAFT FUEL TANK VENT PROTECTOR

This application claims priority to GB 1202545.8 filed 14 Feb. 2012, the entire contents of which is hereby incorporated by reference.

BACKGROUND OF INVENTION

The present invention is concerned with an aircraft fuel tank vent. More specifically, the present invention is concerned with a combined fuel tank vent protector and overpressure device.

Aircraft fuel tanks need to be vented to the atmosphere in use. Increasing and decreasing fuel levels due to fuelling and fuel consumption respectively means there is a variable volume of the tank in and out of which air needs to be able to flow. If air were not able to flow in and out of this volume, fuel entry into, and exit from, the tank would be impeded.

Furthermore, as the aircraft's altitude changes, variations in local atmospheric pressure need to be accounted for to prevent a large, undesirable pressure differential across the skin of the fuel tanks.

Still further, there is a possibility that during fuelling of the tanks they will overflow. In this case the fuel must be able to flow freely from the tank without causing excessive pressure within the fuel tank.

In order to allow flow in and out of the tanks, vents are provided. Such vents are commonly provided with vent protector devices disposed between the vent and the tank. Vent protectors comprise a duct in communication with the tank exterior, which may comprise one or more bends. They may contain other components to ensure that only air, vapour and fuel can pass between the tank and the exterior.

Such vent protector devices may possibly, under certain rare conditions, become blocked.

In order to overcome the problem of blockage overpressure devices have been developed which form an alternative path from the tank to the atmosphere. The overpressure devices do not permit flow under normal operating conditions of the vent protector. However, when the vent protector becomes blocked, the overpressure device is activated and allows passage of fluid in or out of the tank.

In some aircraft fuel tank designs the overpressure device is designed to operate even if the vent protector is not blocked. In these designs the overpressure device will operate to prevent excessive positive or negative pressure differentials between the inside and outside of the tank. These pressures may arise due to fuel overflow during fuelling or a rapid ascent or descent during flight. In any case, the overpressure devices are arranged to prevent excessive pressure differentials from forming between the tank and the exterior.

In known systems, the vent protector and overpressure device are separate components, requiring two penetrations of the fuel tank. This is undesirable for fuel tanks positioned near flight surfaces (e.g. in the wing) because wing skin penetrations create undesirable noise effects and reduce aerodynamic efficiency.

SUMMARY OF INVENTION

It is an aim of the present invention to provide an improved fuel tank vent protector.

According to a first aspect of the invention there is provided an aircraft fuel tank vent having a first interface for fluid communication with an aircraft fuel tank interior, and a second interface for fluid communication with an aircraft fuel tank exterior, the vent comprising:

- a first flow path between the first interface and the second interface, the fuel tank vent having a vent protector positioned in the first flow path, and,
- a second flow path between the first interface and the second interface, the fuel tank vent having a valve positioned in the second flow path,
- wherein the first and second flow paths are common along at least a part of their length such that they are coincident at the second interface.

By coincident, we mean that the flow paths could converge into a single path (i.e. able to mix), or that one flow path is contained within another, in which case the paths may not be able to mix. What is important is that the flow paths are at substantially the same position at the second (i.e. exterior) interface.

Advantageously, providing at least partially coincident flow paths provides the ability to have a single port at the exterior of the fuel tank. If the fuel tank is mounted behind a flight surface (e.g. a wing), this is advantageous as reducing the number of orifices reduces unnecessary drag on the wing and the amount of noise produced.

SUMMARY OF DRAWINGS

An aircraft fuel tank vent protector in accordance with the present invention will now be described in detail and with reference to the accompanying drawings in which:

FIG. 2b is a bottom view of the vent protector of FIG. 2a, FIG. 3a is a sectioned perspective view of a third vent protector in accordance with the present invention, and, FIG. 3b is a perspective view of a part of the vent protector of FIG. 3a.

DETAILED DESCRIPTION OF THE INVENTION

Figure 1A:
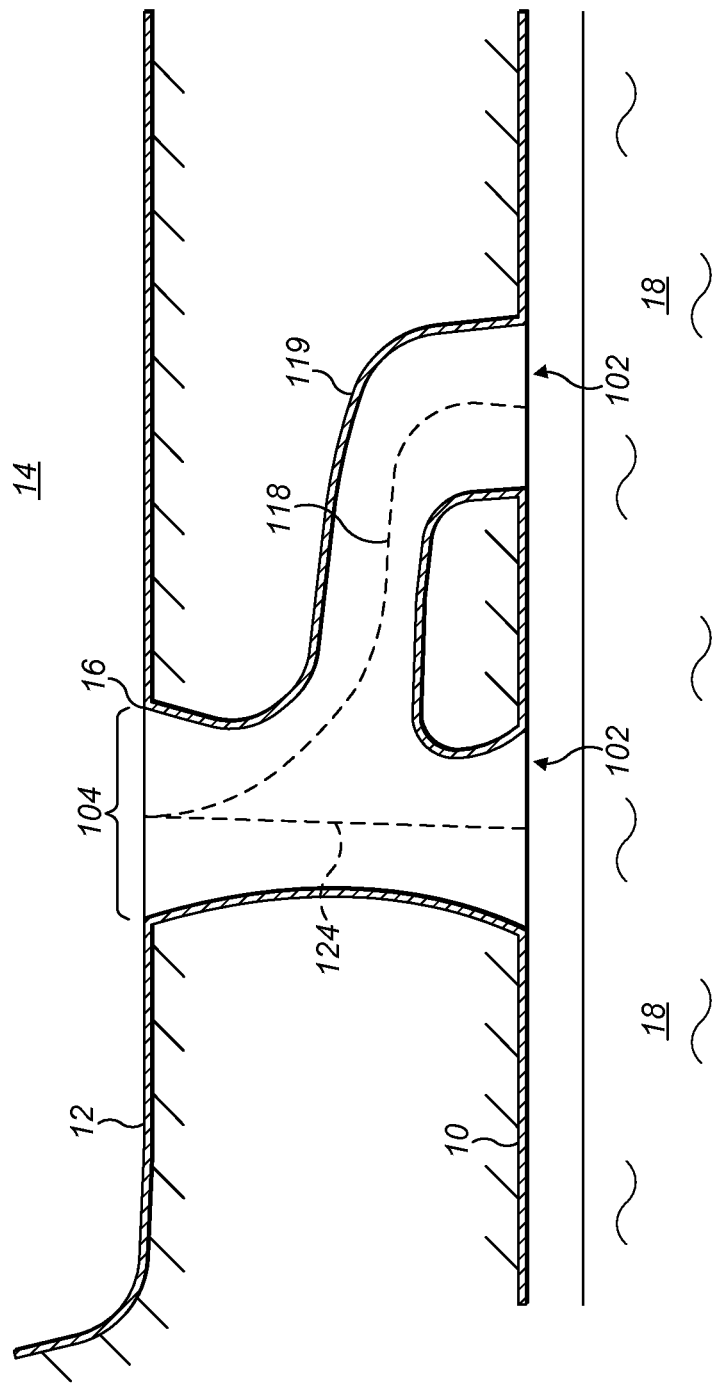
FIG. 1a is a side section view of an aircraft wing comprising a first vent protector in accordance with the present invention.
Figure 1B:
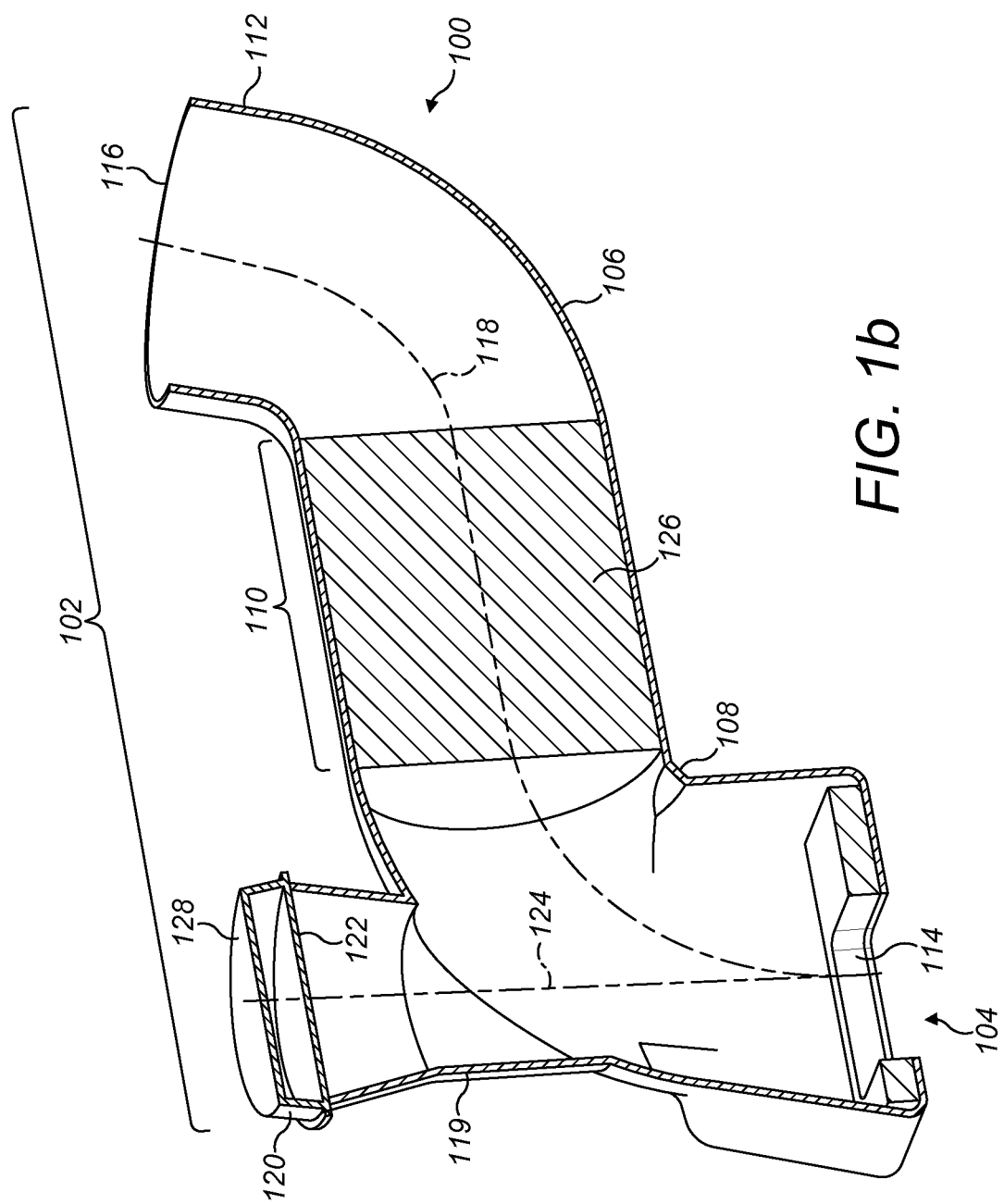
FIG. 1b is a sectioned perspective view of the vent protector of FIG. 1a, FIG. 2a is a sectioned perspective view of a second vent protector in accordance with the present invention.

A vent protector 100 is shown in FIGS. 1a and 1b. The vent protector 100 comprises a fuel tank interface 102 and a vent interface 104. As shown in FIG. 1a, the fuel tank interface 102 is in fluid communication with a fuel tank 10 within an aircraft 12. The vent interface 104 is in fluid communication with the external atmosphere 14 via an orifice 16 in the external surface 12.

The vent protector 100 comprises a vent duct 106 having a first elbow 108, a straight section 110 and a second elbow 112. The first elbow 108 defines a first port 114 which forms the vent interface 104. The second elbow 112 defines a second port 116 which forms part of the tank interface 102. The vent duct 106 permits the passage of fluids therethrough along a vent flow path 118 between the first port 114 and the second port 116.

The vent protector 100 comprises a bypass duct 119 which extends from the first elbow 108 to an overpressure device 120 covering a third port 122. The third port 122 forms part of the tank interface 102 with the second port 116. The bypass duct 118 defines a bypass flow path 124 from the first port 114 to the third port 122. The vent flow path 118 and the bypass flow path 124 coincide proximate the first port 114 and therefore the first interface 104.

A baffle 126 is contained within the straight section of the vent duct 106, midway along the vent flow path 118.

The overpressure device 120 comprises a burst disc 128 which is arranged to open or rupture at a predetermined pressure differential across the overpressure device 120. The burst disc is constructed from a thin, rupturable material and is configured to rupture at a predetermined pressure. The overpressure device 120 comprises a visual indicator on its underside, visible from the first port 114 so that an observer can check if the burst disc 128 has opened or ruptured. The visual indicator is in the shape of a cross or other easily recognisable pattern.

During normal operation, fluids (specifically air with fuel vapour) can flow in and out of the fuel tank along the vent flow path 118. These fluids can flow through the baffle 126.

Should the vent protector become blocked (e.g. at the baffle 126) a pressure differential will build between the tank interface 102 and the vent interface 104. When the pressure differential reaches a predetermined level, the burst disc 128 will open or rupture and the fluid will flow along the bypass flow path 124.

By having the vent flow path 118 and the bypass flow path 124 coincident proximate the first port 114, only a single vent interface 104 is required, which reduces the drag effects on any aircraft wing to which the device is attached. The noise is also reduced. Further, the complexity of installation is reduced because only the first port 114 needs to be attached at the first interface 104.

Figure 2A:
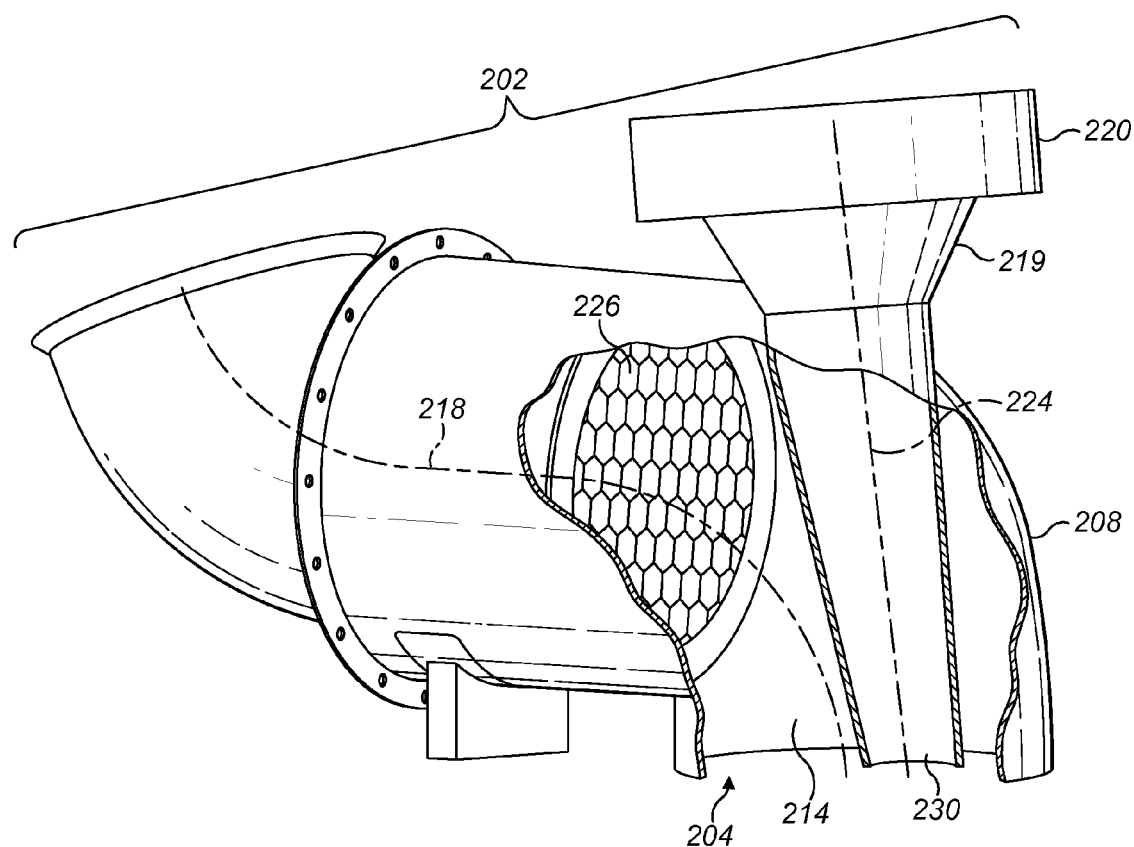

Turning to FIG. 2, a second embodiment of a vent protector 200 is shown. The vent protector 200 is similar to the vent protector 100 and common features are numbered 100 greater.

In the case of the vent protector 200, the bypass duct 219 extends into the first elbow 208, and all the way to the first port 214 where it terminates in a bypass port 230. The bypass port 230 is within the first port 214 forming the vent interface 204.

Figure 2B:
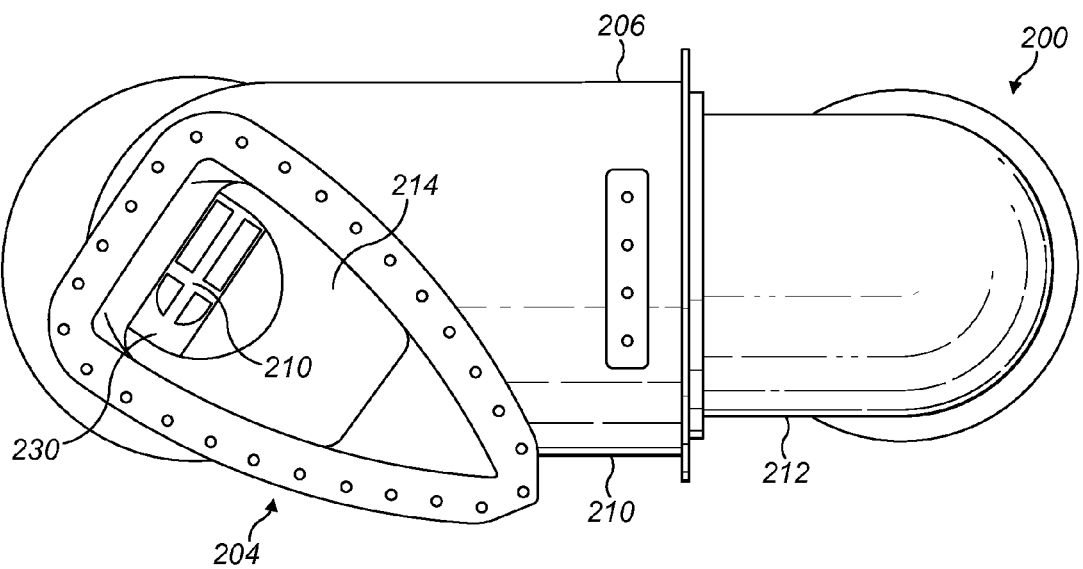

FIG. 2b shows the visibility of the overpressure device 220 from the exterior of the interface 204.

It will be noted that similarly to the protector 100, only a single orifice is required in the wing skin for the interface 204.

Figure 3A:
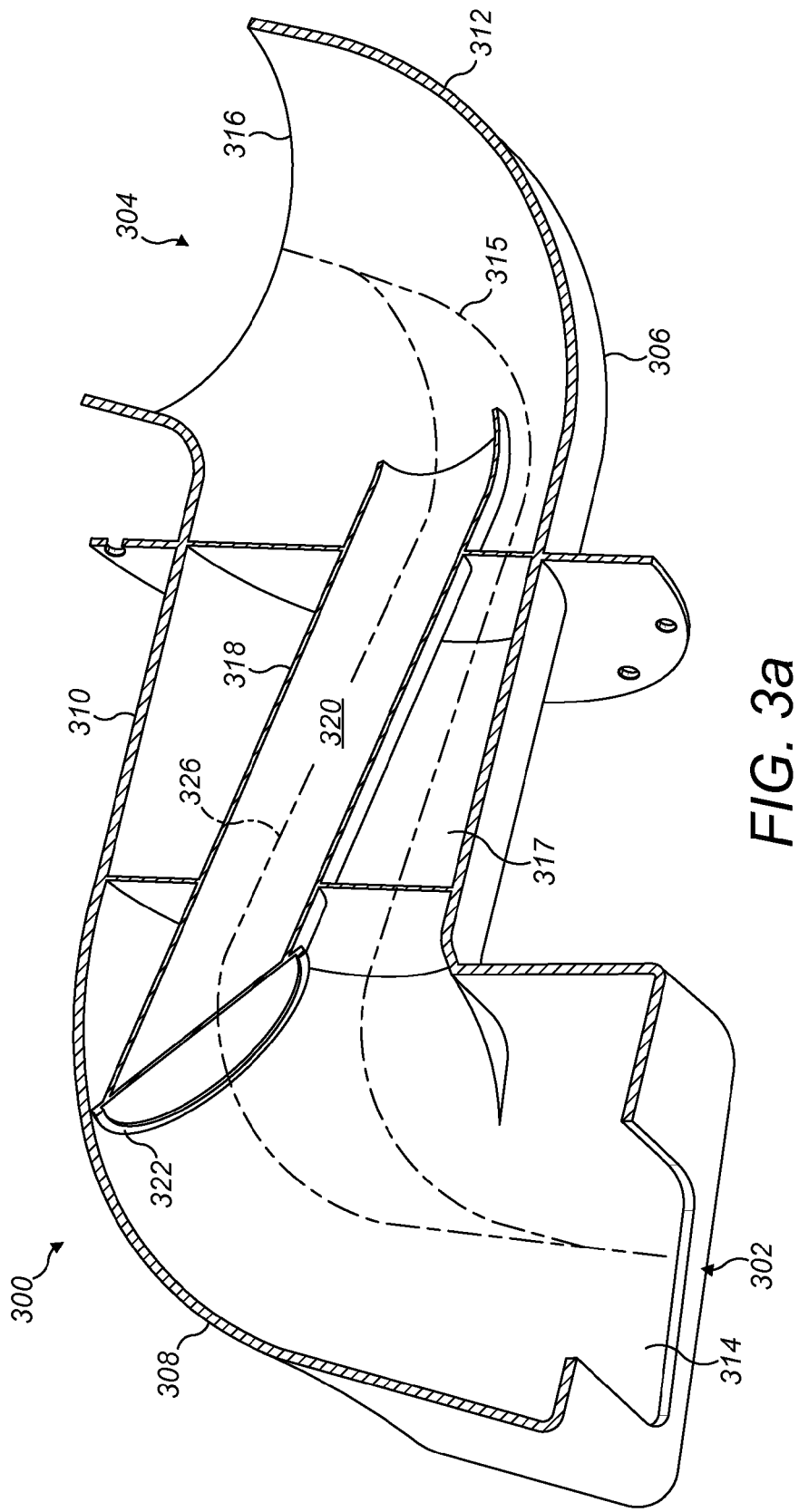

Turning to FIG. 3a, a vent protector 300 is shown. The vent protector 300 comprises a vent interface 302 and a fuel tank interface 304. The vent protector 300 comprises a vent duct 306 having a first elbow 308, a straight section 310 and a second elbow 312. The first elbow 308 defines a first port 314 which forms the vent interface 302. The second elbow 312 defines a second port 316 which forms part of the tank interface 304. The vent duct 306 permits the passage of fluids therethrough along a vent flow path 315 between the first port 314 and the second port 316.

A baffle 317 is provided within the straight section 310.

The vent protector 300 comprises a bypass duct 318 situated within the vent duct 306. The bypass duct 318 comprises a cylindrical tube 320 having a overpressure device 322 positioned at a first end proximate to, and visible through, the first port 314. The overpressure device 322 is configured to operate in the same way as the overpressure device 120. The bypass duct 318 is angled with respect to a central axis of the straight portion 310 such that the ends of the duct 318 are tilted away from the first port 314 and the second port 316. The tilt helps to prevent the accumulation of water at the over pressures device.

Figure 3B:
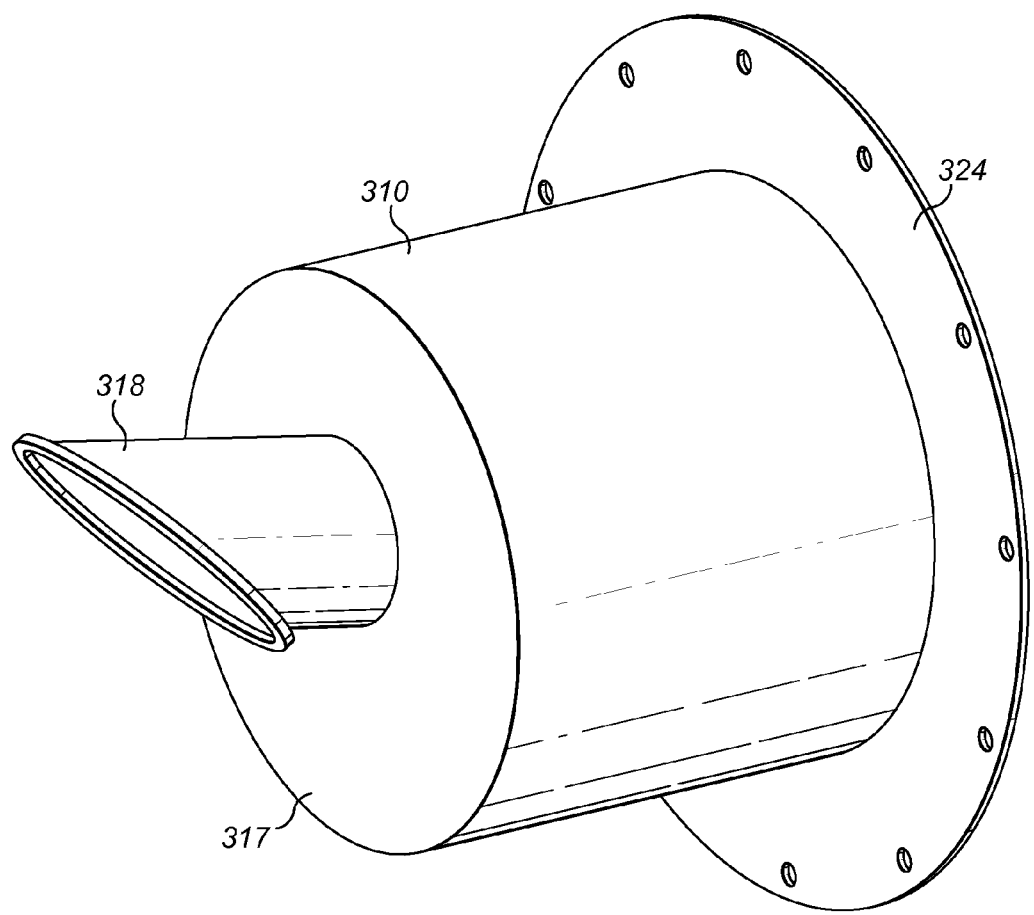

Turning to FIG. 3b, an assembly of the straight section 310 containing the baffle 317 and the bypass duct 318 is shown. The straight section 310 comprises a mounting flange 324. By providing a subassembly, the combined vent and bypass duct can be installed in existing systems.

As shown in FIG. 3a, a bypass flow path 326 is established through the bypass duct 318 once the overpressure device 322 is open. As with the previous embodiments 100, 200, the overpressure device 322 opens or ruptures when the baffle 317 becomes blocked.

As can be seen in each of the above embodiments, the vent flow paths 118, 218, 315 all coincide with the bypass flow paths 124, 224, 326 proximate the vent interface 104 to provide the advantage of a single hole in the fuel tank wall. The flow paths 218, 224 coincide in that the bypass flow path 224 is contained within the vent flow path 218.

The bypass overpressure devices need not be pressure operated devices and may be electronically or manually actuated valves.

The invention claimed is:

1. An aircraft fuel tank vent having a first interface for fluid communication with an aircraft fuel tank interior, and a second interface for fluid communication with an aircraft fuel tank exterior, the vent comprising:
   a first flow path between the first interface and the second interface, wherein the first interface is in fluid communication with an aircraft fuel tank and the aircraft fuel tank vent includes a vent protector positioned in the first flow path, and,
   a second flow path between the first interface and the second interface, the fuel tank vent having a valve positioned in the second flow path,
   wherein the first and second flow paths are common along at least a part of their length such that they are coincident at the second interface.

2. The aircraft fuel tank vent according to claim 1 comprising a vent protector duct and a bypass duct, in which the vent protector duct and the bypass duct share a common port at the second interface.

3. The aircraft fuel tank vent according to claim 1 comprising a vent protector duct and a bypass duct, in which the bypass duct is positioned within the vent protector duct at the second interface such that the second flow path is within the first flow path.

4. The aircraft fuel tank vent according to claim 2 in which the vent protector duct comprises a first port, the bypass duct comprises a second port, the first port and the second port being spaced apart and forming the first interface.

5. The aircraft fuel tank vent according to claim 2 in which the bypass duct extends substantially perpendicularly to the plane of the second interface.

6. The aircraft fuel tank vent according to claim 1 in which the bypass duct is completely contained within the vent protector duct.

7. The aircraft fuel tank vent according to claim 1 in which the valve is pressure sensitive.

8. The aircraft fuel tank vent according to claim 7 in which the valve is a burst disc.

9. The aircraft fuel tank vent according to claim 1 in which the valve comprises a component changeable from a first state when the valve is closed to a second state when the valve is open, which component is visible from the second interface.

10. The aircraft fuel tank vent according to claim 9 in which the component is an actuable valve body.

11. The aircraft fuel tank vent according to claim 9 in which the component is a pressure sensitive valve seal.

12. An aircraft fuel tank comprising:
   a first interface in fluid communication with an interior chamber of the aircraft fuel tank;
   a second interface in fluid communication with an exterior of the aircraft fuel tank;
   a first fluid flow path between the first interface and the second interface;
   a vent protector in the first flow path;

a second fluid flow path between the first interface and the second interface, and a valve positioned in the second flow path, wherein the first and second fluid flow paths merge and are coincident at the second interface.

* * * * *